Jan. 10, 1961 K. JANISZEWSKI 2,967,740
LUBRICANT RETAINER FOR LEADER PIN BUSHINGS AND THE LIKE
Filed March 9, 1959
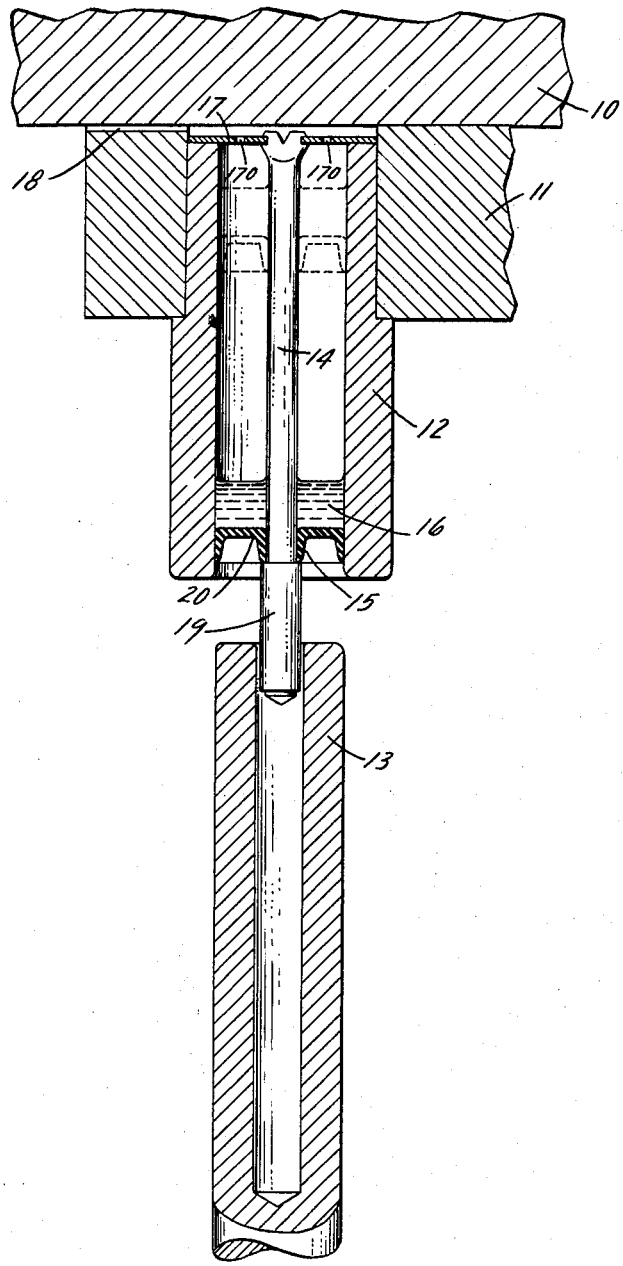
INVENTOR.
KASIMIR JANISZEWSKI
BY
Wheeler, Wheeler and Wheeler
ATTORNEYS.

United States Patent Office 2,967,740
Patented Jan. 10, 1961

2,967,740

LUBRICANT RETAINER FOR LEADER PIN BUSHINGS AND THE LIKE

Kasimir Janiszewski, 5426 Andover Road, Milwaukee, Wis.

Filed Mar. 9, 1959, Ser. No. 798,070

4 Claims. (Cl. 308—5)

This invention relates to a lubricant retainer for leader pin bushings and the like. The subject matter is similar to that disclosed in my Patent No. 2,877,063.

The present invention concerns a modified means of limiting the downward movement of a lubricant retaining piston within the bushing. The piston serves to support a body of oil within the plunger, just as in the construction disclosed in my copending application. However, the retainer guide and stop supporting member here takes the form of a pin centered within the bushing and provided with a sleeve with a press fit which serves as a stop to limit the downward movement of the lubricant retaining piston. To accommodate the guide pin and sleeve, the leader pin is provided with a bore in which the guide pin and its sleeve have a loose fit. The drawing shows the structure in vertical axial section.

A fragment of the punch holder or upper die carrier is shown at 11. This is mounted in any conventional way on the under surface of the die platen 10. The leader pin bushing 12 is mounted in the carrier 11. It does not extend quite to the level of the top of the carrier. Venting is provided by a groove at 18 opening outwardly through the carrier.

The leader pin 13 cooperates with the bushing 12 in the usual way. However, in order to keep the interior surface of the bushing lubricated with a film of oil, a body of oil 16 is confined within the bushing 12 and supported on an oil retaining piston 20 which is guided on a guide rod or pin 14 upon which the flange 15 of piston 20 has a sliding fit.

The guide rod 14 is mounted in a disc 17 which acts as a dirt cover for the interior of the bushing but has a number of holes 170 to provide air communication between the interior of the bushing and the duct 18 which leads to exterior atmosphere.

A collar or sleeve 19 on the lower end of the guide rod 14 acts as a stop against which the plunger seats in the lowermost position, this being the position in which it is illustrated in full lines.

When the press descends to lower the die carrier, the leader pin 13 enters the bushing 12 in the usual manner. In so doing, it lifts the oil retaining piston 20 from its seat on the sleeve 19, thereby moving the body of oil 16 upwardly through the bushing 12 to lubricate the interior surfaces thereof in advance of the entry of the leader pin 13.

When the leader pin is withdrawn from the bushing, it tends to leave a vacuum behind it, and air pressure communicated through duct 18 and the holes 170 will force the piston 20 and the body of oil at 16 downwardly with the leader pin until the piston comes to rest on the sleeve 19 as the leader pin is withdrawn from the plunger.

The guide rod 14 and its dirt cover supporting disc 17 constitute an extremely simple and inexpensive assembly which can be used very effectively to limit downward movement of the oil supporting piston 20, without requiring the undercutting of bushing 12.

Assuming that the drawing shows the parts in their maximum position of relative separation, it will be apparent that the extension of the guide rod between the bushing and the leader pin constitutes a safety device which would tend to prevent either the operator's hand or the material upon which the die set is operating from being injured between the bushing and the leader pin.

I claim:

1. In a device of the character described, the combination with a bushing and leader pin and a floating piston disposed within the bushing and upon which a body of oil may be supported for the lubrication of the bushing, of a guide rod extending centrally through the bushing and upon which said piston is slidably mounted, means on the guide rod for limiting the movement of the piston in one direction, and means for venting the bushing above the piston, said leader pin having a central socket in which the guide rod and said piston limiting means are freely received and from which they are freely withdrawn.

2. The device of claim 1 in which said limiting means comprises a sleeve on the guide rod so disposed as to arrest the movement of the oil-supporting piston in one direction as the leader pin is withdrawn from the bushing.

3. The device of claim 1 in which a disc constitutes a dirt cover for the one end of the bushing and provides a support for the guide rod.

4. In an assembly of the character described, the combination with a punch holder and a bushing mounted therein and terminating short of one end surface of the punch holder, of a disc spanning the bushing, a guide rod mounted in the disc and depending centrally of the bushing, a floating oil-supporting piston within the bushing having bearing portions engaged with the bushing and the guide rod, means on the guide rod in the path of movement in one direction of said piston for limiting the piston movement in said one direction to retain within the bushing the lubricant supported on the piston, and a leader pin receivable into the bushing and socketed to accommodate the guide rod and said limiting means, said leader pin being adapted to move the piston and the body of oil supported thereon in a second direction as the leader pin enters the bushing and to pull the piston and the piston-supported body of oil in said one direction in the bushing to the extent permitted by said limiting means as the leader pin is withdrawn from the bushing, said bushing having vent means above the piston.

References Cited in the file of this patent

UNITED STATES PATENTS

| | | |
|---|---|---|
| 1,918,697 | Gruss | July 18, 1933 |
| 2,288,136 | Janiszewski | June 30, 1942 |